(12) United States Patent
Akazawa et al.

(10) Patent No.: US 7,845,442 B2
(45) Date of Patent: Dec. 7, 2010

(54) HANDLE STRUCTURE OF WALK-BEHIND WORKING MACHINE

(75) Inventors: Kohei Akazawa, Wako (JP); Takayuki Sato, Wako (JP); Kazuyoshi Miyahara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 113 days.

(21) Appl. No.: 12/274,956

(22) Filed: Nov. 20, 2008

(65) Prior Publication Data
US 2009/0127009 A1 May 21, 2009

(30) Foreign Application Priority Data
Nov. 21, 2007 (JP) .............................. 2007-302238

(51) Int. Cl.
*A01D 69/00* (2006.01)
*B62D 51/04* (2006.01)

(52) U.S. Cl. ...................... 180/19.3; 180/19.1; 172/42; 56/10.8; 56/11.3

(58) Field of Classification Search .................. 56/10.1, 56/10.8, 11.1, 11.2, 11.3, 11.4, 14.7, 15.4, 56/15.5, 16.7; 74/488, 489, 471 R; 172/42; 180/6.2, 6.32, 6.48, 6.5, 6.62, 6.7, 19.1, 19.2, 180/19.3
See application file for complete search history.

(56) References Cited

U.S. PATENT DOCUMENTS

| | | | | | |
|---|---|---|---|---|---|
| 4,281,732 | A | * | 8/1981 | Hoch | 180/19.3 |
| 4,538,401 | A | * | 9/1985 | Takamizawa et al. | 56/11.8 |
| 4,882,897 | A | * | 11/1989 | Oshima et al. | 56/11.3 |
| 4,932,192 | A | * | 6/1990 | Ishimaru | 56/11.8 |
| 5,316,097 | A | * | 5/1994 | Meyer et al. | 180/19.1 |
| 5,701,967 | A | * | 12/1997 | Barnard | 180/19.3 |
| 6,796,392 | B2 | * | 9/2004 | Kobayashi et al. | 180/19.3 |
| 7,644,781 | B2 | * | 1/2010 | Moriyama et al. | 172/350 |
| 2005/0252185 | A1 | * | 11/2005 | Osborne | 56/10.8 |

FOREIGN PATENT DOCUMENTS

JP    2004-217116 A    8/2004

* cited by examiner

*Primary Examiner*—Lesley Morris
*Assistant Examiner*—Marc A Scharich
(74) *Attorney, Agent, or Firm*—Arent Fox, LLP

(57) ABSTRACT

A handle structure of a walk-behind working machine includes: a handle having left and right raised portions extending upward from a handle frame and a cross portion interconnecting the left and right raised portions; and a main clutch lever shiftable from a clutch-OFF position to a clutch-ON position by being pivoted into pressed abutment against the cross portion. The main clutch lever is constructed in such a manner that, when the main clutch lever is in abutment against the cross portion, a space for allowing a human operator to grip the left and right raised portions is secured between the left and right raised portions and the main clutch lever.

4 Claims, 9 Drawing Sheets

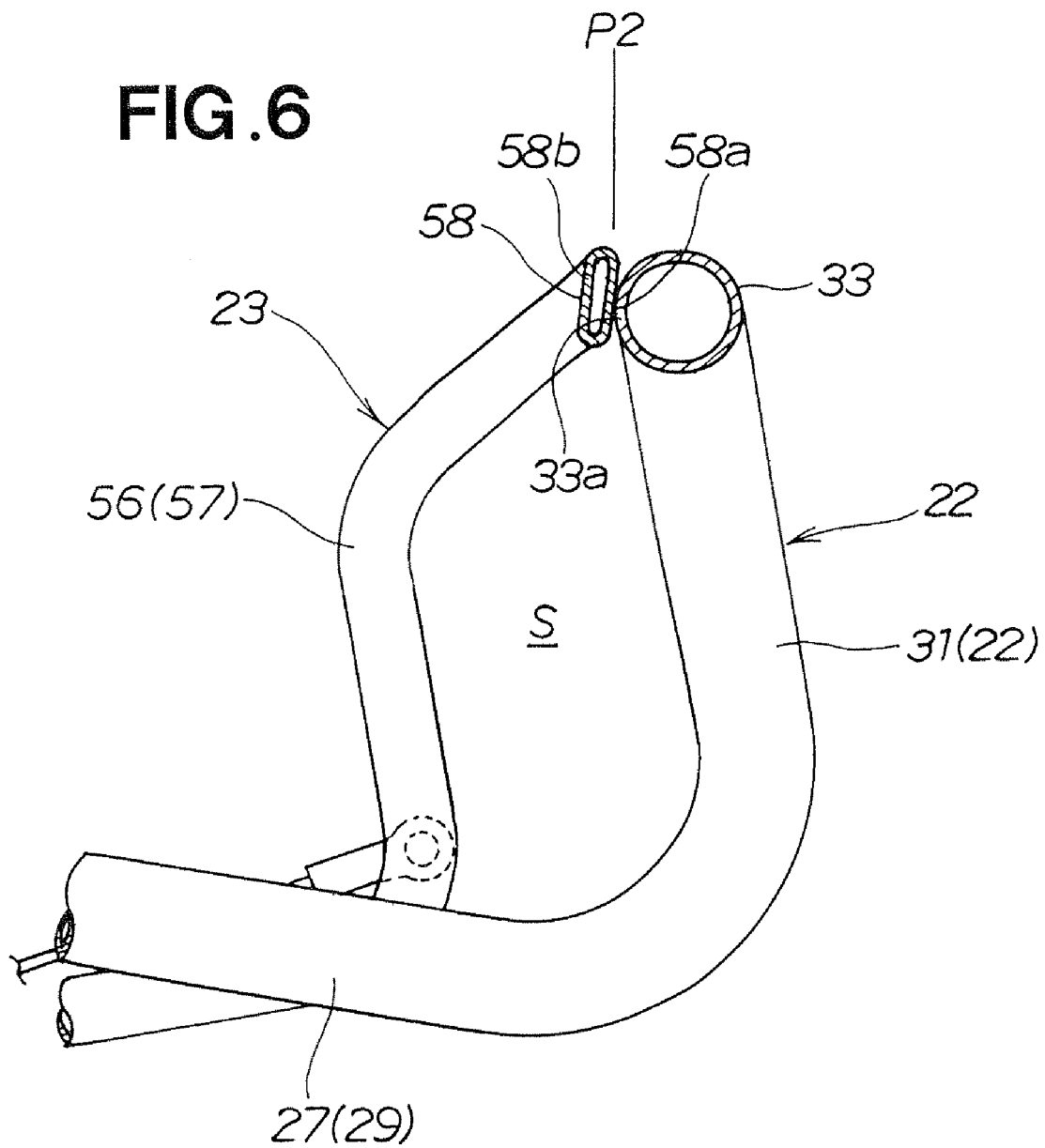

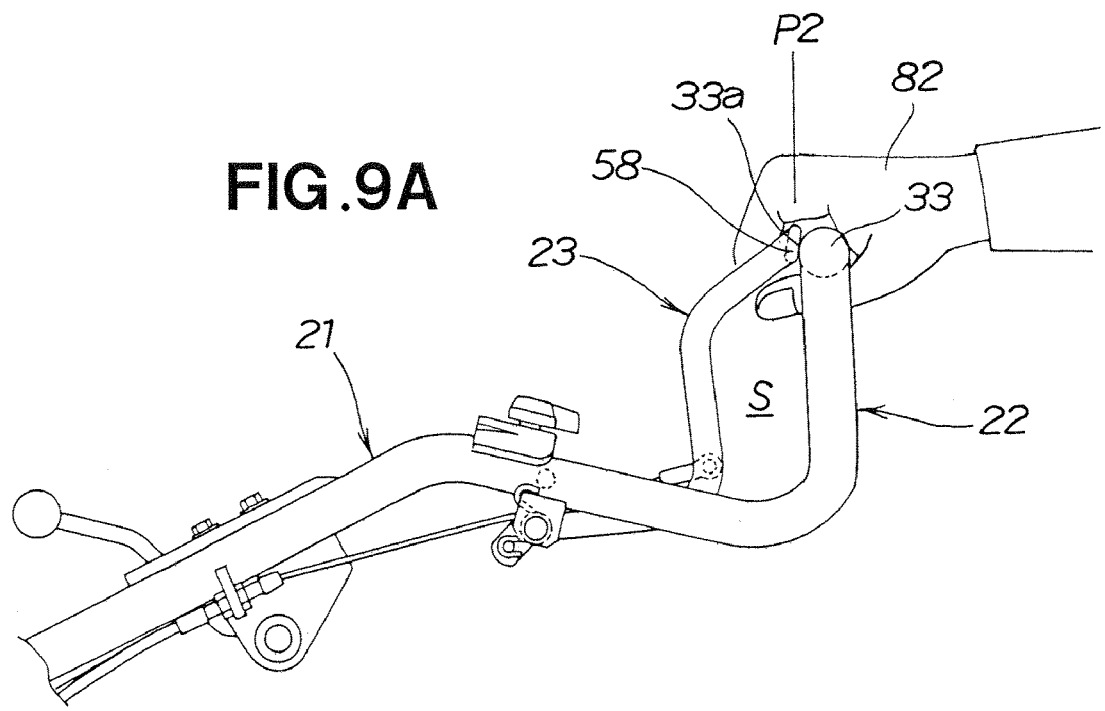
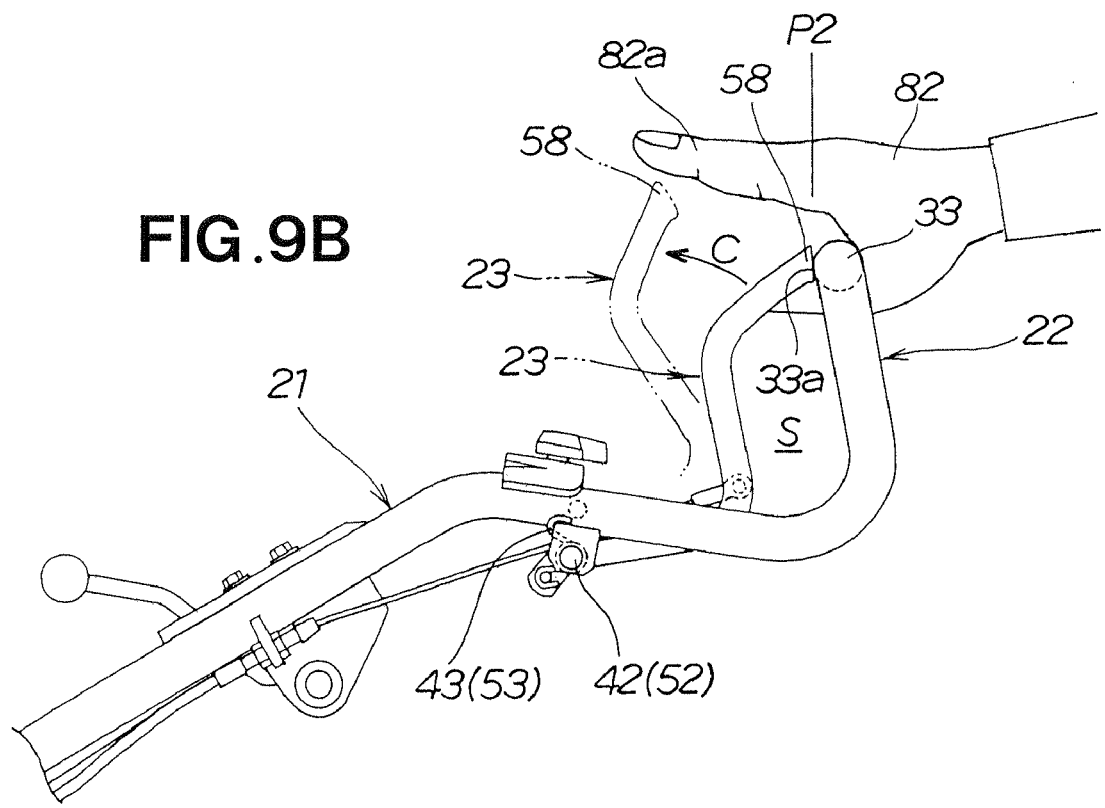

HANDLE STRUCTURE OF WALK-BEHIND WORKING MACHINE

CROSS-REFERENCE TO RELATED APPLICATION

This application claims the priority of JP Application No. 2007-302238, filed Nov. 21, 2007, the entire specification, claims and drawings of which are incorporated herewith by reference.

FIELD OF THE INVENTION

The present invention relates to an improvement of handle structures of walk-behind working machines which have a handle provided on a rear end portion of a handle frame and a main clutch lever pivotable into pressed abutment against the handle.

BACKGROUND OF THE INVENTION

Among the conventionally-known handle structures of walk-behind working machines are ones where a loop-shaped handle is provided on a rear end portion of a handle frame and a main clutch lever is pivotably connected to the handle frame. The loop-shaped handle has left and right raised portions extending upwardly from left and right rear ends of the handle frame, and a cross portion interconnecting respective upper ends of the left and right raised portions (see, for example Japanese Patent Application Laid-Open Publication JP 2004-217116 A). In the handle structure disclosed in JP 2004-217116 A, the main clutch is shiftable to an operating position (ON position) by the main clutch lever being pivotally moved into pressed abutment against the handle. Thus, when the main clutch is in pressed abutment against the handle, a left side portion of the main clutch lever and the left raised portion of the handle, or a right side portion of the main clutch lever and the right raised portion of the handle, can be gripped together by a human operator.

However, the handle structure disclosed in JP 2004-217116 A may impose a great load on the human operator when firmly and reliably gripping the handle together with the main clutch lever. Further, if the human operator is gripping any one of the left and right raised portions when he or she moves or pivots the main clutch lever into pressed abutment against the handle, the main clutch lever would hit a hand of the human operator gripping the raised portion. Thus, when the human operator pivots the main clutch lever into pressed abutment against the handle, he or she has to open the hand, gripping the left or right raised portion, so that the main clutch lever may not hit the hand.

SUMMARY OF THE INVENTION

In view of the foregoing prior art problems, it is an object of the present invention to provide an improved handle structure of a walk-behind working machine which allows a human operator to firmly and reliably grip the handle without imposing a load on the human operator and allows the human operator to move the main clutch lever into pressed abutment against the handle while simultaneously gripping the handle.

In order to accomplish the above-mentioned object, the present invention provides an improved handle structure of a walk-behind working machine, which comprises: a handle having: left and right raised portions extending upward from left and right rear ends of a handle frame that extends obliquely rearwardly and upwardly from a rear portion of a machine body of the working machine; and a cross portion interconnecting respective upper ends of the left and right raised portions; and a main clutch lever connected to the handle frame for pivotal movement between a clutch-OFF position and a clutch-ON position, the main clutch lever being shiftable from the clutch-OFF position to the clutch-ON position by being pivoted rearwardly into abutment against the cross portion, the main clutch lever being formed in such a manner that, when the main clutch lever is in abutment against the cross portion, a space for allowing a human operator to grip the left and right raised portions (i.e., accommodating some of the fingers of the human operator) is secured between the left and right raised portions and the main clutch lever.

The main clutch lever is formed in such a manner that, when the main clutch lever is in pressed abutment against the cross portion of the handle, a space capable of accommodating some of the fingers of the human operator gripping the raised portions is secured between the left and right raised portions (or vertical portions) and the main clutch lever. Thus, it is possible to prevent the main clutch lever from hitting the hands of the human operator gripping the raised portions. In this way, the human operator can appropriately move or pivot the main clutch lever rearwardly into pressed abutment against the cross portion of the handle while simultaneously gripping any one of the raised portions, and there is no need for the human operator to grip together the raised portion and main clutch lever with one hand. Consequently, the human operator can firmly and reliably grip the handle with utmost ease, i.e. with no particular load imposed on the human operator.

In the aforementioned manner, the human operator can move the main clutch lever into pressed abutment against the cross portion of the handle while simultaneously gripping any one of the raised portions. Thus, the human operator can firmly and reliably grip the handle (specifically, any one of the raised portions with no particular load imposed on the human operator. As a result, the operability of the walk-behind working machine of the present invention can be significantly enhanced.

Preferably, the main clutch lever is pivotably connected to the underside of the handle frame. Thus, an ON/OFF (activation/deactivation) switching member or other desired operating member can be provided in a region over a portion of the handle frame where the main clutch lever is connected to the handle frame. In this way, the ON/OFF (activation/deactivation) switching member or other desired operating member can be provided close to the handle (i.e., close to the human operator), so that the operability of the walk-behind working machine of the invention can be even further enhanced.

Further, the main clutch lever has a generally S-shaped profile as viewed sideways. Thus, an upper end portion of the main clutch lever can be located close to the cross portion of the handle, and vertical portions of the main clutch lever opposed to the left and right raised portions (vertical portions) of the handle can be spaced forwardly from the left and right raised portions. Thus, with the simple construction where the main clutch lever is merely formed in a generally S-shaped profile, a sufficient space can be defined between the raised portions and the main clutch lever when the main clutch lever is in pressed abutment against the cross portion of the handle.

In an embodiment, the left and right raised portions each have a height set on the basis of the width of the human operator's hand gripping one of the left and right raised portions. Then, when the left and right raised portions are gripped by the human operator's hands, the little finger of each of the hands can be abutted against the handle frame with the thumb abutted against the cross portion. In this way, the hands gripping the left and right raised portions can be prevented from undesirably sliding in an up-down direction of the machine, so that the human operator can firmly and reliably grip the handle with no particular load imposed on the operator.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will be described in detail below, by way of example only, with reference to the accompanying drawings, in which:

FIG. 6 is a sectional view showing a cross bar pressed against a cross portion of the handle structure of the invention;

FIGS. 9A and 9B are views explanatory of an example manner in which the main clutch lever of the handle structure is shifted from the clutch-ON position to the clutch-OFF position.

DETAILED DESCRIPTION OF THE PREFERRED EMBODIMENTS

In the following description, the terms "front", "rear", "left" and "right" are used to refer to directions as viewed from a human operator. Whereas a walk-behind cultivating machine will hereinafter be described as a preferred embodiment of a walk-behind working machine of the present invention, the present invention is not limited to the walk-behind cultivating machine.

Figure 1:
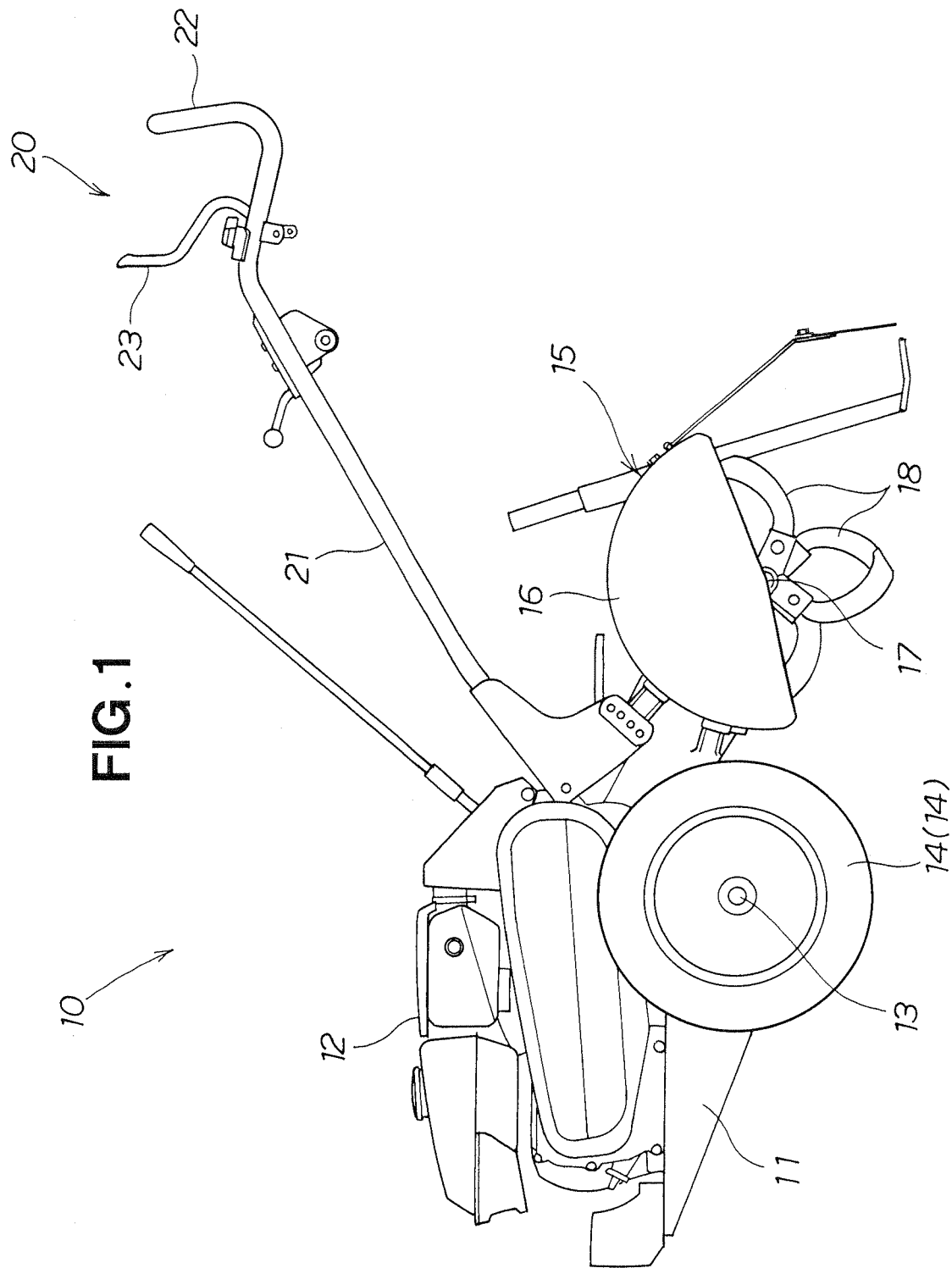
FIG. 1 is a side view showing a handle structure of a walk-behind cultivating machine according to an embodiment the present invention.

FIG. 1 is a side view showing a handle structure of the walk-behind cultivating machine 10 of the present invention. The walk-behind cultivating machine 10 includes: an engine 12 mounted on an upper portion of a machine body 11; left and right wheels 14 mounted on lower end portions of the machine body 11 via an axle 13; a cultivator 15 mounted on a rear portion of the machine body 11; and a handle structure 20 mounted on a rear portion of the machine body 11.

The cultivator 15 includes a cultivator cover 16 ascendably and descendably mounted on a rear portion of the machine body 11, a plurality of cultivating claws 18 attached to the cultivator cover 16 via a rotation shaft 17, and a power transmission section (not shown) for transmitting rotation of the engine 12 to the rotation shaft 17.

The handle structure 20 includes a handle frame 21 extending obliquely rearwardly and upwardly from a rear portion of the machine body 11, a loop-shaped handle 22 formed on rear end portions of the handle frame 21, and a main clutch lever 23 pivotably mounted to the handle frame 21.

Figure 2:
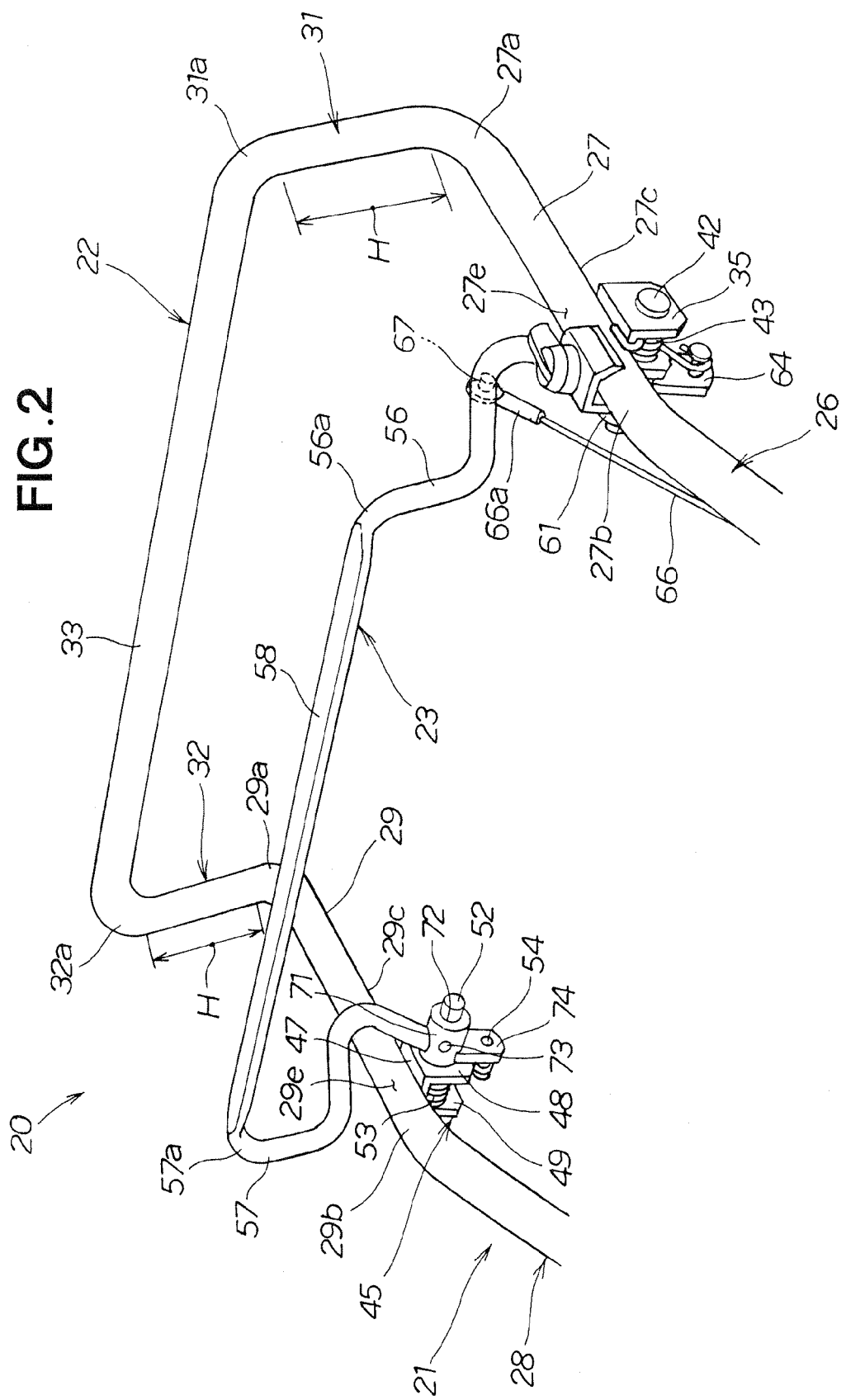
FIG. 2 is a perspective view of the handle structure of the walk-behind working machine.
Figure 3:
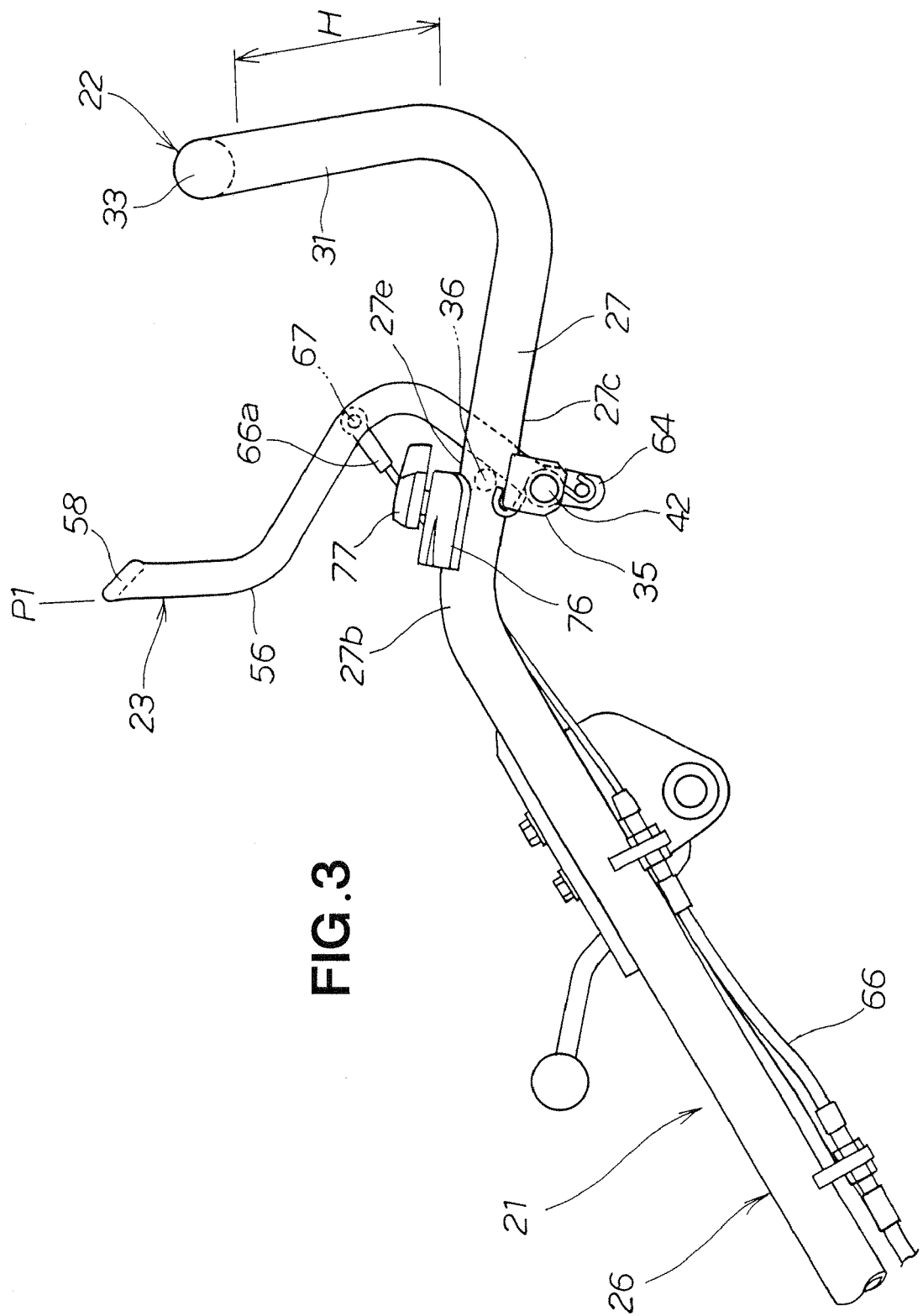
FIG. 3 is a side view of the handle structure of the present invention.

FIG. 2 is a perspective view of the handle structure 20 of the walk-behind working machine, and FIG. 3 is a side view of the handle structure 20. In FIGS. 2 and 3, the main clutch lever 23 is shown as being held in an non-operating (i.e., clutch-OFF) position.

The handle frame 21 has a left handle frame section 26 obliquely extending rearwardly and upwardly from a left rear portion of the machine body 11, and a right handle frame section 28 extending obliquely rearwardly and upwardly from a right rear portion of the machine body 11.

The left handle frame section 26 is of a cylindrical pipe shape having a left rear horizontal portion 27 extending generally horizontally, and the right handle frame section 28 is of a cylindrical pipe shape having a right rear horizontal portion 29 extending generally horizontally.

The loop-shaped handle 22 is generally in the form of a gate-shaped cylindrical pipe member, which has a left raised portion (or vertical portion) 31 extending upwardly from a rear end 27a of the left rear horizontal portion 27 (i.e., left rear end of the handle frame 21), a right raised portion (or vertical portion) 32 extending upwardly from a rear end 29a of the right rear horizontal portion 29 (i.e., right rear end of the handle frame 21) and a cross portion 33 interconnecting respective upper ends 31a and 32a of the left raised portion 31 and right raised portion 32.

The left horizontal portion 27, formed integrally with the left raised portion 31, has a left mounting bracket 35 fixed to the underside of a front end portion 27b thereof (i.e., the underside of the handle frame 21), and a stopper pin 36 is provided on an inner side 27d of the left horizontal portion 27.

Figure 4:
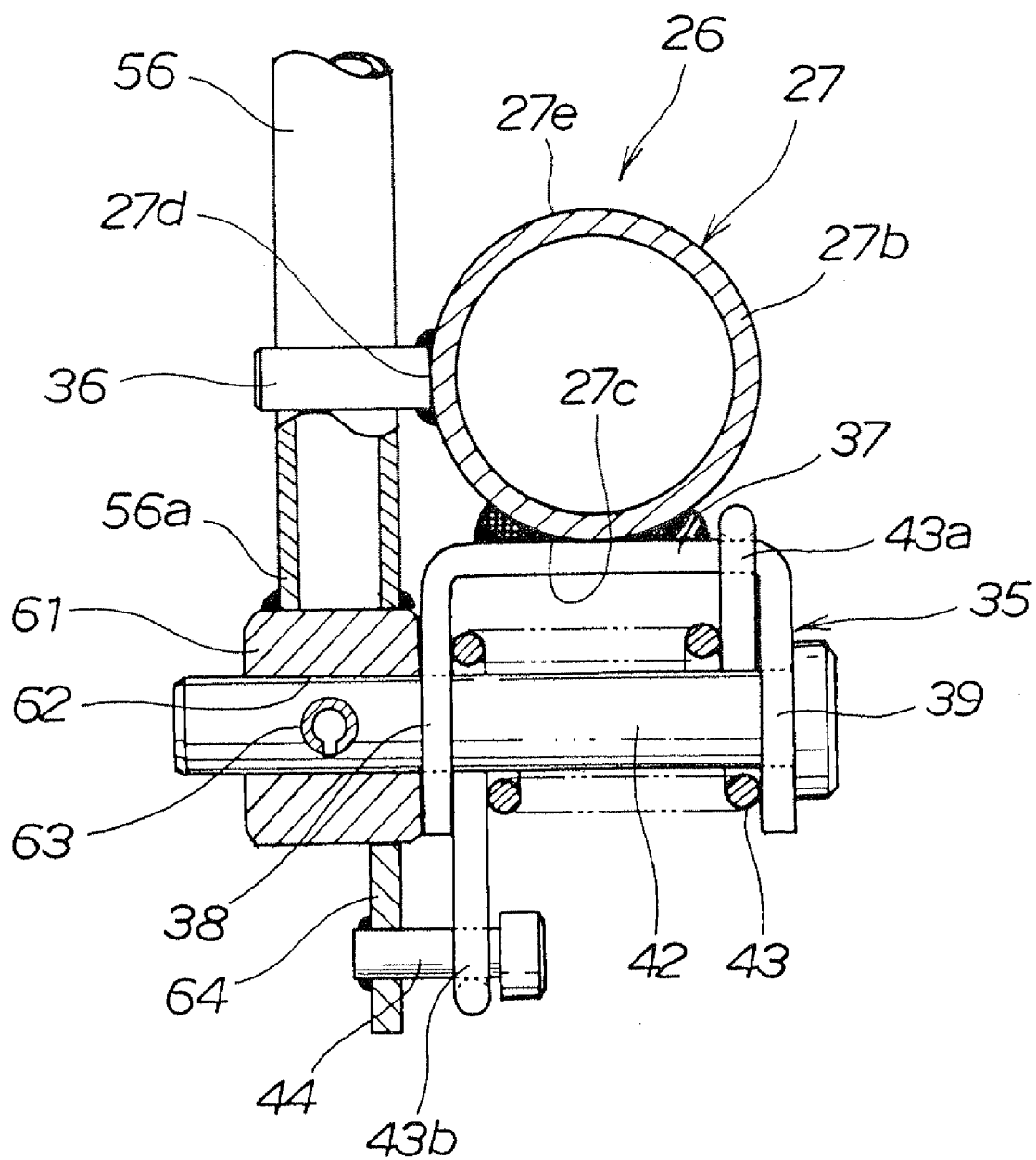
FIG. 4 is a front view showing a left mounting bracket of the handle structure of the present invention.

FIG. 4 is a front view showing the left mounting bracket 35 of the handle structure of the present invention. The left mounting bracket 35, which has a generally inverted-U shape, has an upper wall portion 37 welded to the underside 27c of the front end portion 27b of the left rear horizontal portion 27, and inner and outer side wall portions 38 and 39 extending from inner and outer ends of the upper wall portion 37.

Left support pin 42 is pivotably mounted to the inner and outer side wall portions 38 and 39, and a left coil spring 43 is mounted on the left support pin 42. The left coil spring 43 has one end portion 43a retained by the upper wall portion 37, and another end portion 43b retained by a left locking pin 44. The left locking pin 44 is mounted to a left projecting piece 64 that will be described later. The left support pin 42 is normally urged counterclockwise by the left coil spring 43 mounted thereon.

Referring back to FIGS. 2 and 3, the right rear horizontal portion 29, formed integrally with the right raised portion 32, has a right mounting bracket 45 fixed to the underside 29c of a front end portion 29b thereof (i.e., the underside of the handle frame 21), and the stopper pin 36 is provided on an inner side of the front end portion 27b. The right mounting bracket 45 is constructed and disposed in left-right symmetric relation to the left mounting bracket 35.

The right mounting bracket 45, which is of a generally inverted-U shape, has an upper wall portion 47 welded to the underside 29c of the front end portion 29b of the right rear horizontal portion 29, and inner and outer side wall portions 48 and 49 extending from the inner and outer ends of the upper wall portion 47.

Right support pin 52 is pivotably mounted to the inner and outer side wall portions 48 and 49 in coaxial relation to the above-mentioned left support pin 42, and a right coil spring 53 is mounted on the right support pin 52. Similarly to the left coil spring 43, the right coil spring 53 has one end portion retained by the upper wall portion 47, and another end portion retained by a right locking pin 54. The right locking pin 54 is mounted to a right projecting piece 74 that will be described later. The right support pin 52 is normally urged counterclockwise by the right coil spring 53 mounted thereon.

The left raised portion 31 has a height H set on the basis of a width W (see FIG. 7A) of the left hand of the human operator gripping the left raised portion 31. Similarly, the right raised portion 32 has a height H set on the basis of a width (not shown) of the right hand of the human operator gripping the right raised portion 32. The left raised portion 31 and the right raised portion 32 are disposed in left-right symmetric relation to each other.

The main clutch lever 23 is attached to the left and right mounting brackets 35 and 45 via the left and right support pins 42 and 52. Namely, the main clutch lever 23 has a left leg portion 56 pivotably connected to the left mounting bracket 35 via the left support pin 42, a right leg portion 57 pivotably connected to the right mounting bracket 45 via the right support pin 52, and a cross bar 58 interconnecting respective upper ends 56a and 57a of the left and right leg portions 56 and 57.

The left leg portion 56, which is of a cylindrical pipe shape, has a generally S-shaped (i.e., crank-like) profile and is located in front of the left raised portion 31.

As shown in FIG. 4, the left leg portion 56 has a left boss 61 at its lower end, and the left support pin 42 is fitted in a fitting hole 62 of the left boss 61. The left boss 61 and left support pin 42 are fixed together by means of a left lock pin 63, and the left locking pin 44 is mounted to the left projecting piece 64 extending downward from the left boss 61. Operating cable 66 is connected at its rear end 66a to the left leg portion 56 via a connecting pin 67.

The right leg portion 57, which is of a cylindrical pipe shape, has a generally S-shape (i.e., crank-like) profile and is disposed in front of the light raised portion 32 and in left-right symmetrical relation to the left leg portion 56.

The right leg portion 57 has a right boss 71 at its lower end, and the right support pin 52 is fitted in a fitting hole 72 of the right boss 71. The right boss 71 and right support pin 52 are fixed together by means of a right lock pin 73, and the right locking pin 54 is mounted to the right projecting piece 74 extending downward from the right boss 71.

The cross bar 58, which is of a flatly-collapsed pipe shape and interconnects the upper ends 56a and 57a of the left and right leg portions 56 and 57, extends in parallel to the cross portion 33 of the handle 22.

As noted above, the main clutch lever 23 is pivotably mounted to the underside of the handle frame 21 and normally urged, by the left and right coil springs 43 and 53, in the counterclockwise direction (i.e., toward the front of the machine).

The left leg portion 56 is held in abutment against the stopper pin 36 when the main clutch lever 23 is held in the clutch-OFF position P1 (see FIG. 3) by the biasing force of the left and right coil springs 43 and 53. Namely, by the biasing force of the left and right coil springs 43 and 53, the main clutch lever 23 is held in the clutch-OFF position P1, so that the main clutch can be held in the OFF position.

As the cross bar 58 of the main clutch lever 23 is pulled toward the rear of the machine (i.e., toward the cross portion 33 of the handle 22 or human operator) against the biasing force of the left and right coil springs 43 and 53, the main clutch lever 23 pivots toward the handle 22 about the left and right support pins 42 and 52.

Figure 5:
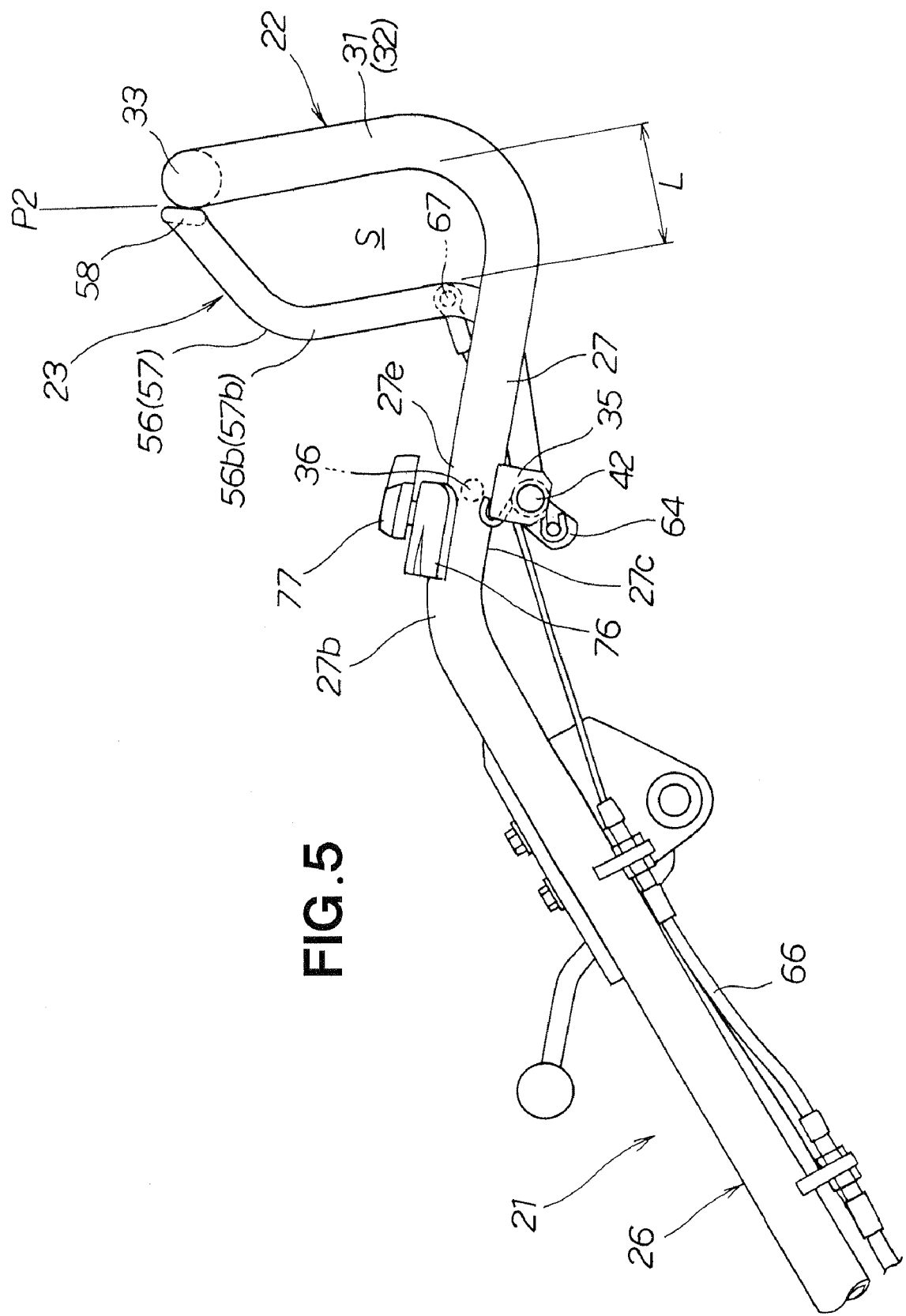
FIG. 5 is a side view showing a main clutch lever of the handle structure held in a clutch-ON position.

FIG. 5 is a side view of the main clutch lever 23 of the handle structure held in a clutch-ON position. The cross bar 58 is held in pressed abutment against the cross portion 33 of the handle 22 when the main clutch lever 23 is in the clutch-ON position P2. In this way, the main clutch can be held in the ON position.

The left and right leg portions 56 and 57 of the main clutch lever 23 each have a generally S-shape profile as viewed sideways. With the left leg portion 56 formed in a generally S shape like this, an upper-half region 56b of the left leg portion 56 has a substantial dog-legged shape. Thus, when the main clutch lever 23 is in the clutch-ON position P2, i.e. when the cross bar 58 is in pressed abutment against the cross portion 33, the upper-half region 56b of the left leg portion 56 is spaced forwardly from the left raised portion 31 by a predetermined distance L.

Similarly, with the right leg portion 57 formed in a generally S shape, an upper-half region 57b of the right leg portion 57 has a substantial dog-legged shape. Thus, when the main clutch lever 23 is in the clutch-ON position P2, the upper-half region 57b of the right leg portion 57 is spaced forwardly from the right raised portion 32 by the predetermined distance L.

Thus, with the simple construction where the main clutch lever 23 is merely formed in a generally S shape, a space S can be secured between the left raised portion 31 and the left leg portion 56 and between the right raised portion 32 and the right leg portion 57 when the cross bar 58 of the main clutch lever 23 is in pressed abutment against the cross portion 33 of the handle 22. The reason for securing the space S between the left raised portion 31 and the left leg portion 56 and between the right raised portion 32 and the right leg portion 57 will be detailed later in relation to FIG. 7.

Because the left mounting bracket 35 fixed to the underside 27c of the front end portion 27b of the left rear horizontal portion 27, a space can be secured in a region over an upper side 27e of the left rear horizontal portion 27 near the left mounting bracket 35.

In this way, there can be provided a sufficient space for mounting a main operation switch 77 in the region over the upper side 27e of the left rear horizontal portion 27 via a mounting bracket 76. Namely, the main operation switch 77, which is an ON/OFF (activation/deactivation) switching member for switching between ON and OFF states of a power supply (battery) of the walk-behind working machine, can be provided close to the handle 22 (i.e., close to the human operator), so that the operability of the walk-behind working machine of the invention can be significantly enhanced.

Similarly, a space can be secured in a region over an upper side 29e of the right horizontal portion 29 near the right mounting bracket 45. Therefore, the main operation switch 77 may alternatively be mounted in the region over the upper side 29e of the right rear horizontal portion 29.

FIG. 6 is a sectional view showing the cross bar 58 pressed against the cross portion 33 of the handle structure of the invention. When the main clutch lever 23 is in the clutch-ON position P2, the cross bar 58 is pressed against the cross portion 33 of the handle 22.

More specifically, a rear flat portion 58a of the flatly-collapsed cross bar 58 is pressed against a front wall 33a of the cross portion 33 of the handle 22. Because the cross bar 58 has a flatly-collapsed shape, a front flat portion 58b of the cross bar 58 can be located close to the cross portion 33, and thus, the human operator can grip the cross bar 58 and cross portion 33 together with ease.

Further, because the rear flat portion 58a of the flatly-collapsed cross bar 58 is pressed against the front wall 33a of the cross portion 33, the cross bar 58 can be disposed on the front side of the cross portion 33. Thus, when the main clutch lever 23 is to be returned to the clutch-OFF position P1 (see FIG. 3), the human operator can release the gripping of the cross bar 58 by just opening forwardly his or her four fingers, i.e. index, middle, ring and little fingers, while still holding the cross portion 33 with the thumb.

Figure 7A:
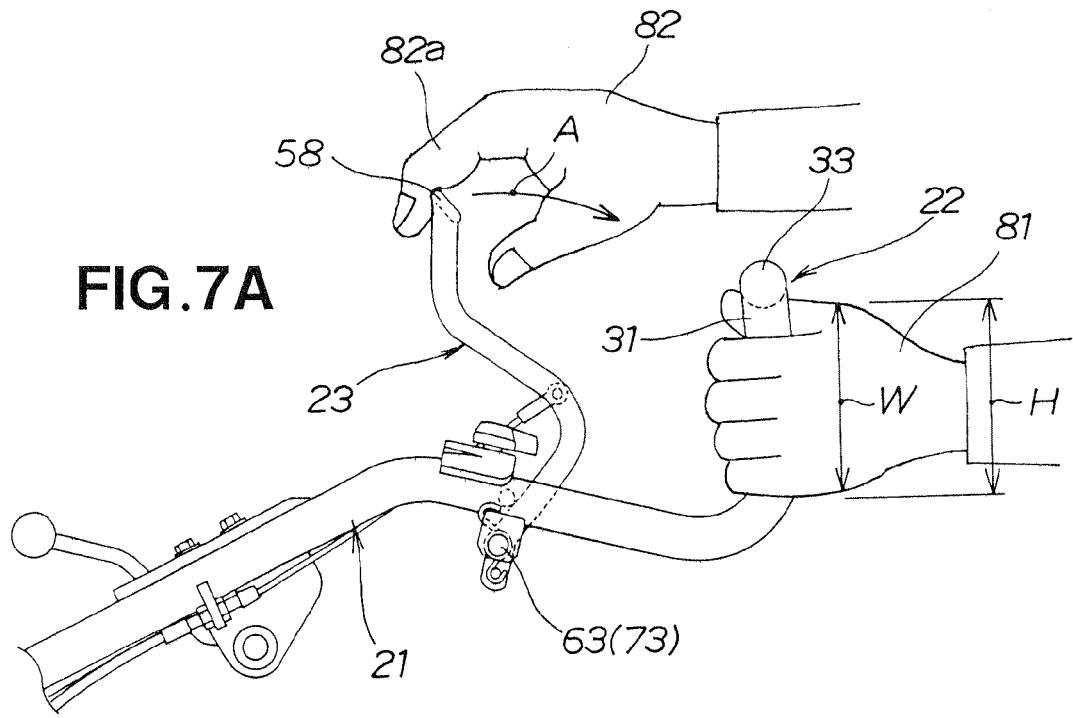
FIGS. 7A and 7B are views explanatory of an example manner in which the main clutch lever of the handle structure is shifted from the clutch-OFF position to the clutch-ON position.
Figure 7B:
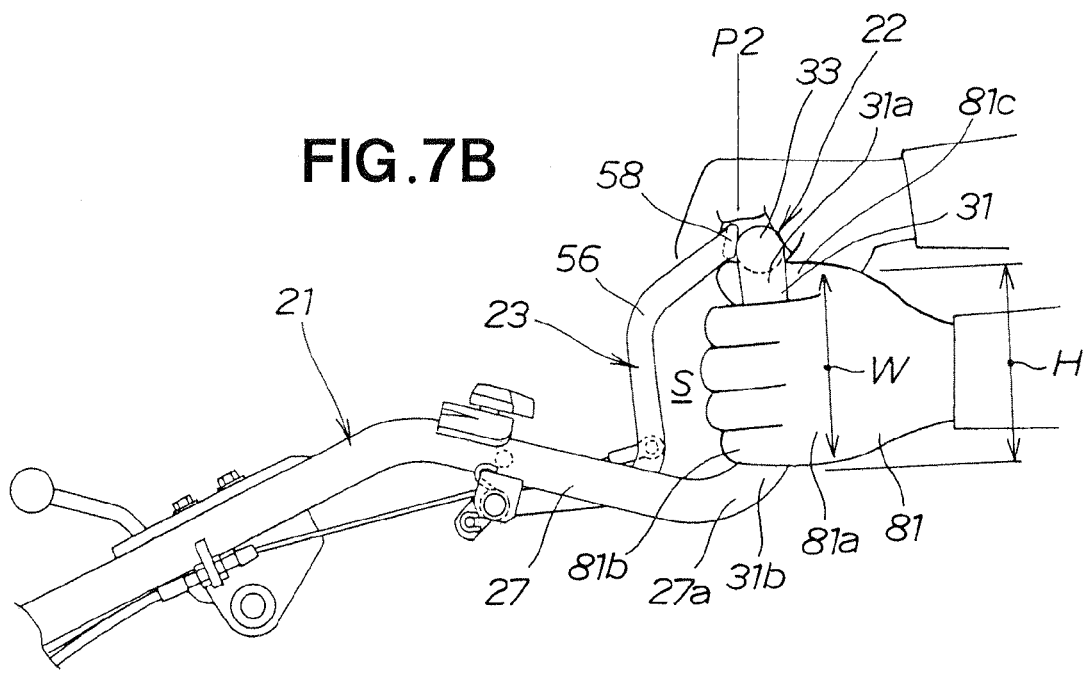
Figure 8:
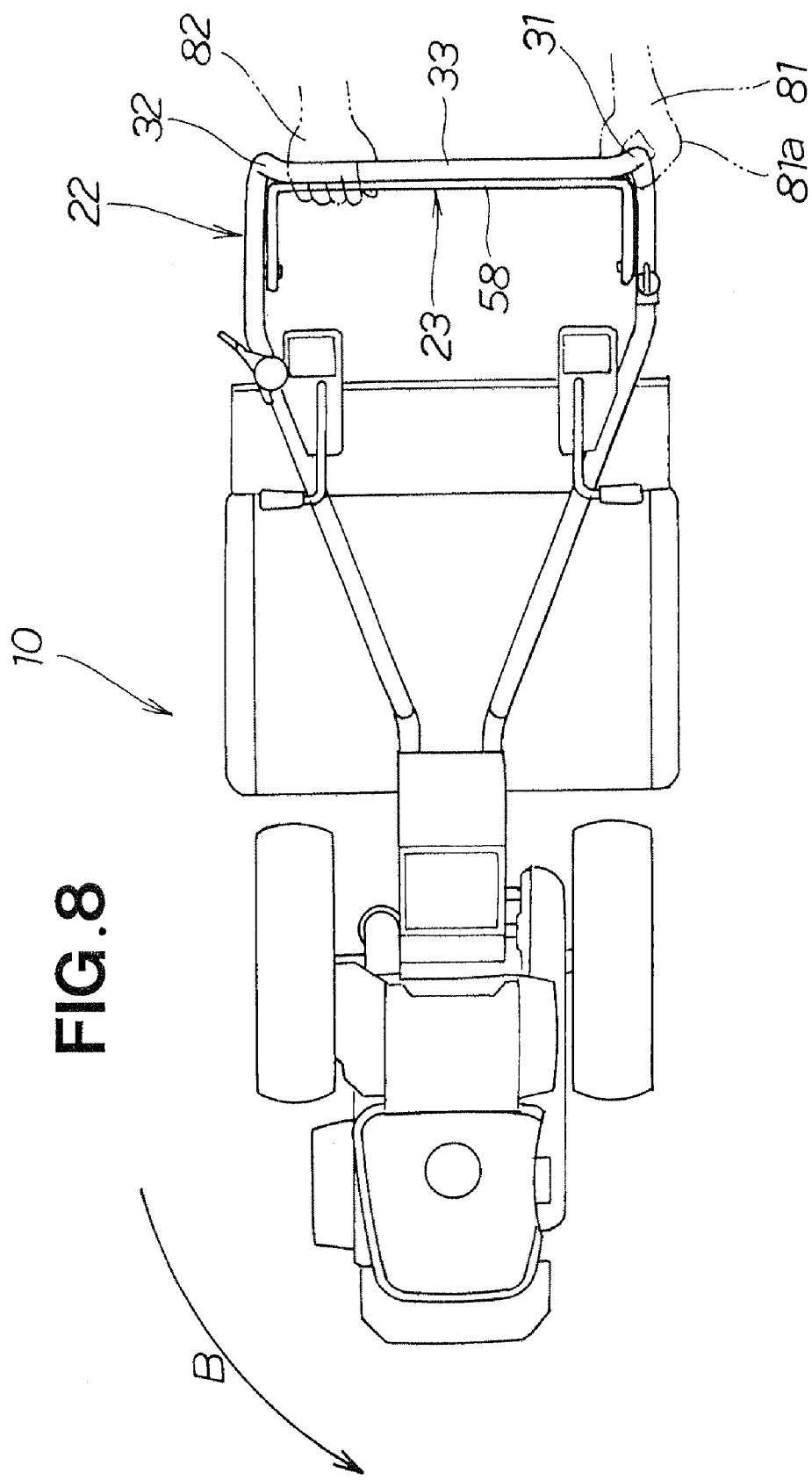
FIG. 8 is a view explanatory of an example manner in which the walk-behind working machine is turned leftward.

With reference to FIGS. 7-9, the following paragraphs describe how the handle structure 20 of the invention is operated. Note that, because the left and right raised portions 31 and 32 are constructed symmetrically with each other, the following paragraphs describe only the left raised portion 31 with description of the right raised portion 32 omitted.

FIGS. 7A and 7B are views explanatory of an example manner in which the main clutch lever 23 of the handle structure 20 is shifted from the clutch-OFF position to the clutch-ON position. As shown in FIG. 7A, the human operator first places the index, middle, ring and little fingers (only the index finger 82a is shown) on the cross bar 58 of the main clutch lever 23 with the left hand 81 gripping the left raised portion 31. Then, the main clutch lever 23 is caused to pivot as indicated by arrow A by the human operator pulling the right hand 82 toward him or her with the left hand 81 still gripping the left raised portion 31.

Then, as shown in FIG. 7B, the cross bar 58 is pressed against the cross portion 33 of the handle 22 so that the main clutch lever 23 is placed in the clutch-ON position P2. In this condition, the space S is secured between the left raised portion 31 and the left leg portion 56.

Thus, the left leg portion 56 can be prevented from undesirably hitting the left hand 81, gripping the left raised portion 31, with the main clutch lever 23 placed in the clutch-ON position P2. In this way, the human operator can appropriately press the cross bar 58 of the main clutch lever 23 against the cross portion 33 of the handle 22 while simultaneously gripping the left raised portion 31.

Because the space S for allowing the human operator to appropriately press the cross bar 58 of the main clutch lever 23 against the cross portion 33 while simultaneously gripping the left raised portion 31 can be secured between the left raised portion 31 and the left leg portion 56 when the main clutch lever 23 is in the clutch-ON position P2, the human operator does not have to grip the left raised portion 31 and leg portion 56 together with the left hand 81. Thus, the human operator can firmly and reliably grip the left raised portion 31 together with the left hand 31 with no particular load imposed on the human operator.

Namely, the human operator can place the main clutch lever 23 in the clutch-ON position P2 with the right hand 82 while simultaneously gripping the left raised portion 31 with the left hand 81. With the left hand 81 gripping the left raised portion 31 alone without gripping the leg portion 56, the human operator can firmly and reliably grip the handle 22 (specifically, left raised portion 31) with no particular load. As a result, the operability of the walk-behind working machine 10 of the invention can be significantly enhanced.

By the main clutch lever 23 being placed in the clutch-ON position P2 in the aforementioned manner, the main clutch can be turned on to cause the walk-behind working machine 10 to travel. The traveling walk-behind working machine 10 can cultivate the soil through driving of the cultivating claws 18 (FIG. 1).

During the cultivating operation by the working machine 10 or at the time of the start/stop of the travel of the working machine 10, the handle 22 may vibrate in the up-down and front-rear directions. Generally, in such a case, the human operator tries to suppress the vibrating movement in order to stabilize the posture of the walk-behind working machine 10.

Because the walk-behind working machine 10 is constructed in the above-described manner, the human operator can grip the left raised portion 31 with the back 81a of the left hand 81 oriented vertically and facing laterally outwardly and hence with the left arm kept in contact with his or her body (i.e., with the left arm pressed to his or her side). If the human operator attempts to grip both the cross portion 33 and cross bar 58 together with the left hand 81 as in the conventionally-known techniques, the back 81a of the left hand 81 has to be oriented horizontally and face upwardly, in which case the left arm would be spaced from his or her body.

In the case where the operator grips the left raised portion 31 with the back 81a of the left hand 81 oriented vertically, a sufficient power of the left arm can be applied to the handle 22 more easily than in the case where the operator grips the left raised portion 31 with the back 81a of the left hand 81 oriented horizontally and facing upward. Thus, by gripping only the left raised portion 31 with the left hand 81, the human operator can suppress more effectively the vibrations occurring in the up-down and front-rear directions.

Further, as noted above, the left raised portion 31 has the height H set on the basis of the width W of the left hand 81 of the human operator gripping the left raised portion 31; namely, the height H of the left raised portion 31 is set in accordance with the width W of the left hand 81. Thus, while the left raised portion 31 is gripped with the left hand 81, the little finger 81b of the left hand 81 can be positioned on a lower end region 31b of the left raised portion 31. Because the lower end region 31b of the left raised portion 31 is curved, it can prevent the left hand 81 from undesirably sliding or moving (or being displaced) downward. In other words, while the left raised portion 31 is gripped with the left hand 81, the little finger 81b of the left hand 81 can be positioned in contact with the rear end 27a of the left rear horizontal portion 27 and thus can be prevented from undesirably moving downward.

Further, while the left raised portion 31 is gripped with the left hand 81, the thumb 81c of the human operator can be positioned in contact with the cross portion 33, so that the left hand 81 can be prevented from moving upward. Thus, the left hand 81 gripping the left raised portion 31 can be prevented from sliding in the up-down direction, so that the human operator can firmly and reliably grip the left raised portion 31 with no particular load imposed. As a result, with the left hand 81 gripping the left raised portion 31, the human operator can suppress even more effectively the vibrations occurring in the up-down and front-rear directions.

FIG. 8 is a view explanatory of an example manner in which the walk-behind working machine 10 is turned leftward. In turning the working machine 10 leftward as indicated by arrow B, the human operator can keep griping the left raised portion 31 with the left hand 81.

As noted above, the human operator can grip the left raised portion 31 with the back 81a of the left hand 81 oriented vertically and hence with the left arm kept in contact with his or her body (i.e., with the left arm pressed to his or her side). If, on the other hand, both the cross portion 33 and cross bar 58 are gripped together with the left hand 81 as in the conventionally-known techniques, the back 81a of the left hand 81 would be oriented horizontally and face upwardly, in which case the left arm would be spaced from his or her body.

Thus, in the case where the human operator grips the left raised portion 31 with the back 81a of the left hand 81 oriented vertically, a sufficient power can be applied to the handle 22 more easily with the left arm 81. In this way, the human operator can readily move or operate the handle 22 appropriately in accordance with desired leftward turning of the working machine 10, and thus, an enhanced operability of the working machine 10 can be achieved.

FIGS. 9A and 9B are views explanatory of an example manner in which the main clutch lever 23 of the handle structure of the invention is shifted from the clutch-ON position to the clutch-OFF position. When the main clutch lever 23 is in the clutch-ON position P2, the cross bar 58 is pressed against the front wall 33a of the cross portion 33, as shown in FIG. 9A. In such a state, the cross bar 58 is located on the front side of the cross portion 33.

Because the cross bar 58 is located on the front side of the cross portion 33, the human operator can release the gripping of the cross bar 58 by just opening forwardly his or her four fingers, i.e. index, middle, ring and little fingers (only the index finger 82a is shown) of the right hand 82, while holding the cross portion 33 with the thumb. As the gripping of the cross bar 58 is released, the main clutch lever 23 is returned to the clutch-OFF position P1 (see FIG. 3), by the biasing force of the left and right coil springs 43 and 53, as indicated by arrow C.

Whereas the handle structure of the present invention has been shown and described as applied to a walk-behind cultivating machine, the present invention is not so limited and may be applied to other types of walk-behind working machines, such as walk-behind lawn mowing machines and grass mowing machines.

Further, whereas the handle structure of the present invention has been shown and described as using the main operation switch 77 as the ON/OFF (activation/deactivation) switching member, the ON/OFF (activation/deactivation) switching member may be any other suitable operation switch, operation lever, or the like. Alternatively, any other desired operation member may be provided in place of the ON/OFF (activation/deactivation) switching member. Needless to say, the human operator may alternatively pivot the main clutch lever 23 while simultaneously gripping the right raised portion (vertical portion) 32 of the handle 22.

The handle structure of the present invention is well suited for application to walk-behind working machines which have a handle provided on a rear end portion of a handle frame and a main clutch lever pressable against the handle.

Obviously, various minor changes and modifications of the present invention are possible in light of the above teaching. It is therefore to be understood that within the scope of the appended claims the invention may be practiced otherwise than as specifically described.

What is claimed is:

1. A handle structure of a walk-behind working machine, comprising:
    a handle frame comprising:
        a left handle frame section; and
        a right handle frame section, wherein the left and right handle frame sections extend obliquely rearwardly and upwardly from a rear portion of a machine body of the working machine and have respective left and right rear portions configured to extend substantially horizontally;
    a handle comprising:
        a left raised portion;
        a right raised portion; and
        a cross portion interconnecting respective upper ends of said left and right raised portions, wherein respective lower ends of the left and right raised portions extend substantially vertically from the respective horizontal left and right rear portions; and
    a main clutch lever connected to the handle frame for pivotal movement between a clutch-OFF position and a clutch-ON position, said main clutch lever being shiftable from the clutch-OFF position to the clutch-ON position by being pivoted rearwardly into abutment against said cross portion, said main clutch lever being shaped in such a manner that, when said main clutch lever is in abutment against said cross portion, a space for allowing a human operator to grip the left and right raised portions is defined between said left and right raised portions and said main clutch lever.

2. The handle structure of claim 1, wherein said main clutch lever is pivotably connected to an underside of the handle frame and has a generally S-shaped profile as viewed from a left side of the machine body of the working machine.

3. The handle structure of claim 1, wherein the main clutch lever comprises a cross bar connecting left and right leg portions, the cross bar extending parallel to the cross portion of the handle.

4. The handle structure of claim 3, wherein when the cross bar is in abutment with the cross portion, upper half regions of the left and right leg portions dogleg away from the respective left and right raised portions to define the space for allowing a human operator to grip the left and right raised portions.

* * * * *